United States Patent
Georgiou et al.

(10) Patent No.: US 11,068,052 B2
(45) Date of Patent: Jul. 20, 2021

(54) HOLOGRAPHIC IMAGE GENERATED BASED ON EYE POSITION

(71) Applicant: Microsoft Technology Licensing, LLC, Redmond, WA (US)

(72) Inventors: Andreas Georgiou, Cambridge (GB); Joel Steven Kollin, Seattle, WA (US); Charles Thomas Hewitt, Cambridge (GB); Neil Emerton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/355,264

(22) Filed: Mar. 15, 2019

(65) Prior Publication Data

US 2020/0293108 A1     Sep. 17, 2020

(51) Int. Cl.
| | |
|---|---|
| G06F 3/01 | (2006.01) |
| G02B 5/02 | (2006.01) |
| G02B 27/00 | (2006.01) |
| G03H 1/22 | (2006.01) |
| G06K 9/00 | (2006.01) |

(52) U.S. Cl.
CPC ........... *G06F 3/013* (2013.01); *G02B 5/0252* (2013.01); *G02B 27/0093* (2013.01); *G03H 1/2286* (2013.01); *G06K 9/00604* (2013.01)

(58) Field of Classification Search
CPC .............. G03H 1/2286; G02B 27/0093; G02B 5/0252; G06F 3/013; G06K 9/00604
See application file for complete search history.

(56) References Cited

U.S. PATENT DOCUMENTS

| | | | |
|---|---|---|---|
| 10,048,647 B2 | 8/2018 | Large et al. | |
| 2013/0100362 A1* | 4/2013 | Saeedi | G02B 5/30 349/11 |
| 2016/0238845 A1* | 8/2016 | Alexander | G03H 1/2645 |
| 2016/0274365 A1 | 9/2016 | Bailey et al. | |
| 2016/0331224 A1* | 11/2016 | Uji | A61B 3/0033 |
| 2016/0335475 A1* | 11/2016 | Krenzer | G06T 5/002 |
| 2016/0379606 A1 | 12/2016 | Kollin et al. | |
| 2018/0008141 A1* | 1/2018 | Krueger | A61B 5/744 |
| 2018/0081322 A1 | 3/2018 | Robbins et al. | |

(Continued)

OTHER PUBLICATIONS

"Yepes et al., Dynamic Digital Holography for recording and reconstruction of 3D images using Optoelectronic devices, Sep. 2017, Journal of Microwaves, Optoelectronics and Electromagnetic Applications, onlibe version ISSN 2179-1074" (Year: 2017).*

(Continued)

*Primary Examiner* — Anner N Holder
(74) *Attorney, Agent, or Firm* — Alleman Hall Creasman & Tuttle LLP

(57) ABSTRACT

A holographic display system includes an eye tracker configured to determine a position of a feature of an eye, a light source configured to output image light, and a digital dynamic hologram. The digital dynamic hologram is configured to receive the image light from the light source. The digital dynamic hologram is further configured to spatially modulate the image light based on a target image to form a reconstructed image in the eye. The reconstructed image includes noise that is non-uniformly distributed across the reconstructed image based on the position of the feature of the eye.

11 Claims, 7 Drawing Sheets

(56) References Cited

U.S. PATENT DOCUMENTS

| | | |
|---|---|---|
| 2018/0188688 A1 | 7/2018 | Maimone et al. |
| 2018/0232048 A1* | 8/2018 | Popovich ............... A61B 3/113 |
| 2019/0163267 A1* | 5/2019 | Hainzl .................... G06F 3/013 |
| 2019/0179409 A1* | 6/2019 | Jones ................. G02B 27/0093 |

OTHER PUBLICATIONS

Application as Filed in U.S. Appl. No. 16/155,741, filed Oct. 9, 2018, 57 Pages.

"International Search Report and Written Opinion Issued in PCT Application No. PCT/US2020/021288", dated May 13, 2020, 11 Pages.

\* cited by examiner

HOLOGRAPHIC IMAGE GENERATED BASED ON EYE POSITION

BACKGROUND

Holographic displays can form two-dimensional (2D) and three-dimensional (3D) distributions of light that emulate a real-life visual experience. Holographic displays can be used to provide augmented reality (AR) experiences and/or virtual reality (VR) experiences by presenting virtual imagery directly to a user's eye. Such virtual imagery can take the form of one or more virtual objects that are displayed such that they appear as if they are physical objects in the real world.

SUMMARY

A holographic display system includes an eye tracker configured to determine a position of a feature of an eye, a light source configured to output image light, and a digital dynamic hologram. The digital dynamic hologram is configured to receive the image light from the light source. The digital dynamic hologram is further configured to spatially modulate the image light based on a target image to form a reconstructed image in the eye. The reconstructed image includes noise that is non-uniformly distributed across the reconstructed image based on the position of the feature of the eye.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Computer-generated holograms (CGHs) can be used to form an image in a user's eye. A computer-generated hologram may be complex—i.e., the hologram may include both amplitude and phase components. Typically, a computer-generated hologram may modulate only one of the complex components to reconstruct an image. For example, a computer-generated hologram may modulate the phase of a wavefront of incident light, while the amplitude as a function of the phase remains constant and as close to unity as possible. However, there is no exact solution where the amplitude fully converges to unity when the phase is modulated. This deviation from unity causes noise to be introduced into an image reconstructed by the computer-generated hologram.

Accordingly, the present disclosure is directed to a holographic display approach that leverages the visual and physiological characteristics of the eye to obscure noise in an image from being perceived by a user. In particular, a position of a feature of a user's eye may be determined. For example, the feature may include a fovea in a retina of the user's eye. Furthermore, a computer-generated hologram may be designed such that noise may be non-uniformly distributed across an image based on the determined position of the feature of the eye. Referring to the above example, noise may be positioned in regions of the image that are peripheral to the determined position of the fovea, where the perceptive power of the eye is weaker. In accordance with this holographic display approach, the image may be perceived by the user as being of higher quality, since the noise is less perceptible by the user. Moreover, such image quality improvement may be realized without introducing any additional components to a holographic display system. In another example, noise is positioned based on a determined position of the user's pupil, so that the noise is not perceptible to the user.

Figure 1:
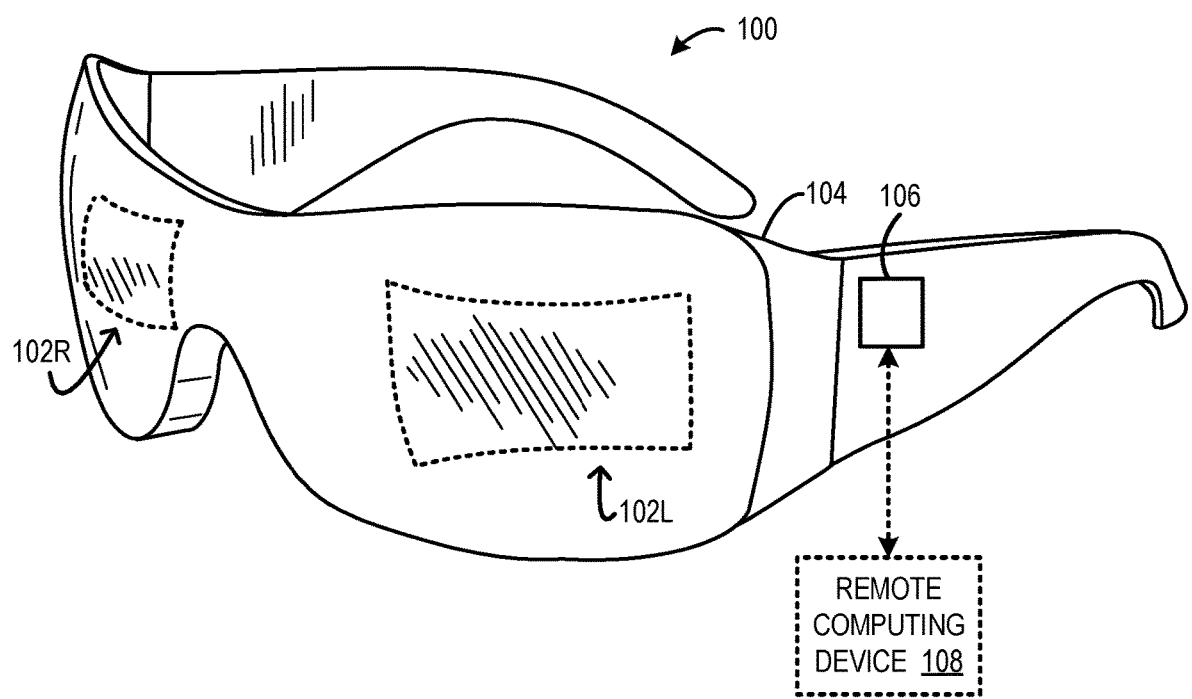
FIG. 1 schematically shows an example near-eye display device.

FIG. 1 shows an example holographic display device in the form of a near-eye display device 100. The display device 100 includes right-eye and left-eye holographic display systems 102R and 102L mounted to a frame 104 configured to rest on a wearer's head. Each of the right-eye and left-eye holographic display systems 102 include light-manipulating image display componentry configured to project computerized virtual imagery into left and right eyes of a wearer of the display device 100. In one example, the light-manipulating image display componentry includes one or more holographic optical elements. An example holographic display system representative of the right-eye and left-eye holographic display systems 102R and 102L is described in more detail below with reference to FIG. 2.

In some implementations, the right-eye and left-eye holographic display systems 102R and 102L include a field of view (FOV) that is wholly or partially transparent from the perspective of the wearer, to give the wearer a view of a surrounding real-world environment. In other implementations, the FOVs of the right-eye and left-eye display systems 102R, 102L are opaque, such that the wearer is completely absorbed in virtual-reality (VR) imagery provided via the near-eye display device. In yet other implementations, the opacities of the FOVs of the right-eye and left-eye holographic display systems 102R, 102L may be dynamically controlled via a dimming filter. A substantially see-through display window, accordingly, may be switched to full opacity for a fully immersive virtual-reality experience.

Display device 100 includes an on-board computing system in the form of a controller 106 configured to render the computerized display imagery via the right-eye and left-eye holographic display systems 102R, 102L. The controller 106 is configured to send appropriate control signals to the right-eye holographic display system 102R to form a right-eye image. Likewise, the controller 106 is configured to send appropriate control signals to left-eye holographic display system 102L to form a left-eye image. The controller 106 may include a logic subsystem and a storage subsystem, as discussed in more detail below with respect to FIG. 10.

Operation of the display device 100 additionally or alternatively may be controlled by one or more remote computing device(s) 108 (e.g., in communication with a display device 100 via a local area network and/or wide area network).

Figure 2:
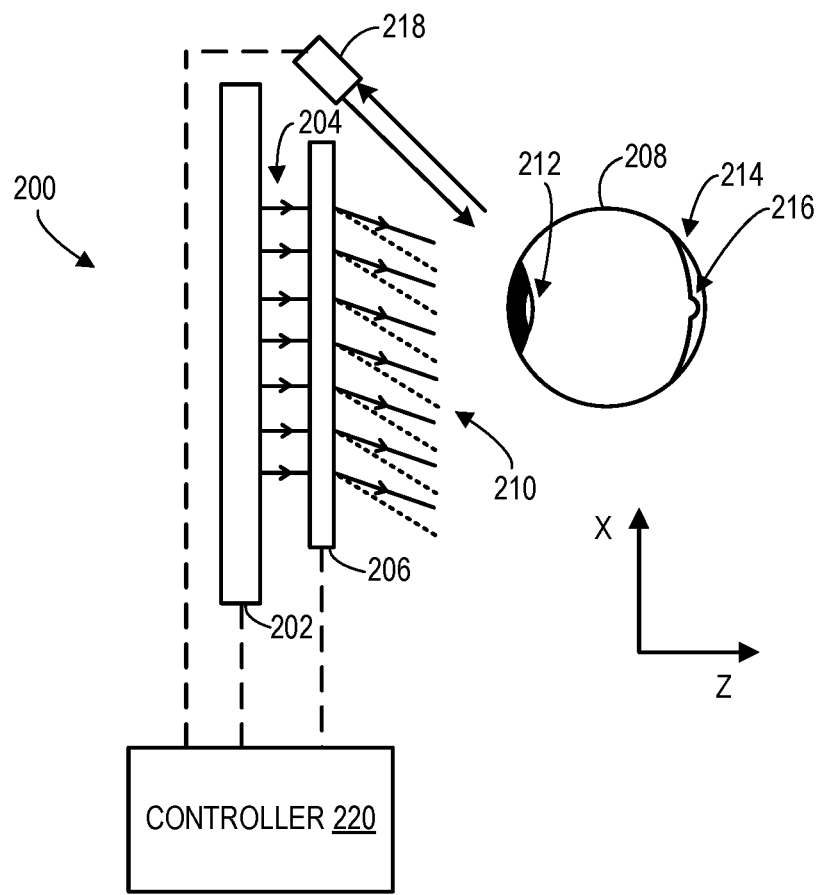
FIG. 2 schematically shows an example holographic display system that may be implemented in a near-eye display device.

FIG. 2 schematically shows an example holographic display system 200 in simplified form. For example, the holographic display system 200 may be incorporated into a display device, such as near-eye display device 100 of FIG. 1. In particular, the holographic display system 200 may be representative of the right-eye or left-eye holographic display systems 102R, 102L of the display device 100 of FIG. 1. In another example, the holographic display system 200 may be incorporated into a computing system 1000 of FIG. 10. Generally, the holographic display system 200 may be incorporated into any suitable display device configured to direct coherent illumination light through a digital dynamic hologram to form an image. In some implementations, the holographic display system may be incorporated into a large-format display device, a projection display device, a mobile display device (e.g., smartphone, tablet), or another type of display device.

Holographic display system 200 is operable to position an exit pupil and provide an eyebox in which virtual imagery generated by the holographic display system is viewable by a user's eye. As used herein, an "eyebox" refers to a two-dimensional plane in which a human eye pupil can receive image light from the holographic display system 200. In practical implementations, the eyebox need not be a plane or rectangle, though it will be described herein as such for the sake of simplicity. It will be understood that FIG. 2 depicts aspects of the example holographic display system 200 schematically, and is not drawn to scale.

Holographic display system 200 includes a light source 202 configured to output light 204 at any of a range of angles. In some examples, the light source 202 may include a directional backlight. In some examples, the light source 202 may include a micro-projector and a steerable micro-mirror. In other examples, different light sources arranged at different angles may be used to vary an input angle by selecting which light to use for illumination, or any other suitable method of varying a light input angle may be used. The light source 202 may be configured to output collimated light 204, that may be spatially modulated by a digital dynamic hologram (DDH) 206 to create an image. Additionally or alternatively, the light source 202 may include any suitable optics for outputting light for creating and projecting images. In some implementations, the light source 202 may include a spatial light modulator for creating an image. The term "light source" is used herein as any suitable optics for outputting light to the other depicted components, whether the light does or does not encode an image.

The light 204 output from light source 202 may be substantially monochromatic or multi-color (e.g., red, green, blue). In some examples that utilize multi-color light, light source 202 may perform color field-sequential display. For implementations in which aberration correction components are used to correct for any aberrations in the exit pupil (e.g., caused by steering of the exit pupil), such components may be independently controlled for each color channel to provide aberration correction suited for each color channel. One example of such corrective components may include a phase modulating display panel, such as a transmissive liquid crystal panel or a reflective liquid crystal on silicon (LCOS) display. Other corrective elements may include a liquid crystal (LC) lens, a micromirror array, and a deformable mirror, as examples.

In the depicted example, light 204 output from light source 202 is introduced into the DDH 206. Although the light rays exiting the light source 202 and entering the DDH 206 are depicted as being parallel to each other, in practice the light rays may be converging or diverging light rays. While not depicted in FIG. 2, one or more in-coupling elements optionally may be provided to facilitate in-coupling of light 204 into the DDH 206.

The DDH 206 may be configured to form at least a portion of virtual imagery that is projected toward a user's eye 208. For example, the DDH 206 may be logically partitioned into a plurality of digital holograms that each form part of an image using light 204 from the light source 202. The plurality of digital holograms may be formed by partitioning a single image producing panel and/or by providing multiple separate image producing panels. The DDH 206 may be configured to produce imagery via first order diffracted light, and/or through the use of other orders of diffracted light. In some implementations, the DDH 206 may be a reflective element. In other implementations, the DDH 206 may be a transmissive element.

By using a DDH 206 for image formation, there is no need for additional relay optics between the DDH 206 and the user's eye 208. This allows for a compact and scalable near-eye display device. In addition, the DDH 206 may be relatively large in size, which helps to decrease aperture diffraction, and thus improve image quality relative to a micro-display. Moreover, such a configuration may be optically efficient relative to other configurations that use a micro-display, as light is primarily steered rather than attenuated to form the image. Further, aberrations in any optical components may be corrected by the DDH 206. Additionally, the pixels in the DDH 206 can be as small as desired, as diffractive effects are used to form the image. In other words, there is no minimum pixel size requirement in order to achieve a desired resolution.

The DDH 206 may be configured to receive light 204 from the light source 202. The DDH 206 may be configured to split the light 204 into myriad different light rays corresponding to image pixels. In the depicted example, only two pixels of the image are shown as solid and dotted parallel light rays. Note that the parallel light rays correspond to points of infinity, but it is also possible to have diverging light rays indicating points at a certain distance for the user's eye 208.

The DDH 206 may be configured to modulate the phase of the incident wavefront of the light 204 at each pixel. In particular, the DDH 206 may be configured to spatially modulate image light 210 to enter the user's eye 208 via human eye pupil 212 and strike the retina 214, causing the light 210 to be perceived as the reconstructed image. Although FIG. 2 depicts the parallel light rays stopping at a point outside of the human eye pupil 212, this is for illustration purposes only. In practical use, the image light 210 may converge toward a focal point that lies before, within, or beyond the human eye 208. In some examples, the exit pupil formed by the DDH 206 may coincide with the human eye pupil 212. Light entering the human eye pupil 212 may be focused by the eye lens to modify the light's focal point, for example to focus the light at the retina 214. When light is stereoscopically projected toward retinas of both eyes at once, the virtual imagery may be perceived as a three-dimensional object that appears to exist at a three-dimensional position within the user's environment, some distance away from the user.

Figure 3:
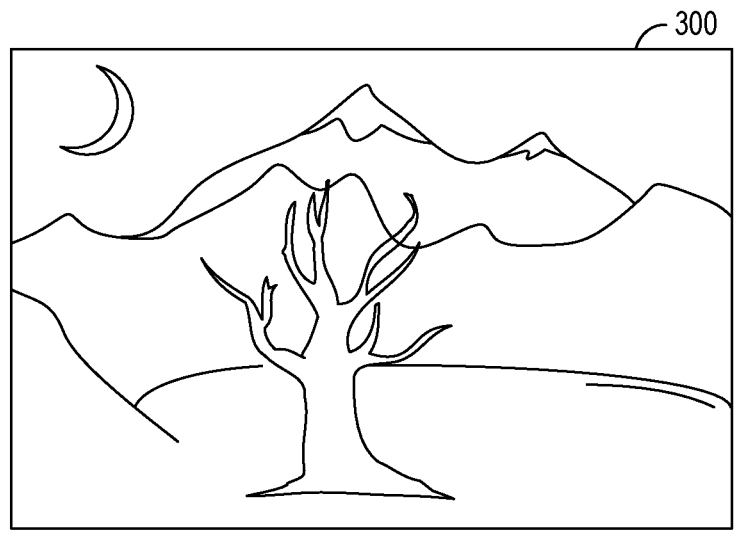
FIG. 3 shows an example target image.

The DDH 206 may be configured to spatially modulate the light 204 based on a target image to form a reconstructed image in the user's eye 208. The target image may be generated by a controller 220 that is operatively connected to the light source 202 and the DDH 206. FIG. 3 shows an example of a target image 300 that may be generated by the controller 220 of FIG. 2. Note that the target image 300 as depicted is free from any random noise. The controller 220 may generate the target image 300 in any suitable manner. The goal of holographic display system is to cause the reconstructed image to replicate the target image with noise that is minimally perceptible to the user.

The target image 300 may include a plurality of image pixels. Each image pixel may have a target intensity. Further, the DDH 206 may be configured, for each of a plurality of display pixels corresponding to the plurality of image pixels of the target image, to modulate a phase of an incident wavefront of the image light 204 based on the target intensity of the corresponding image pixel to output an actual intensity. The difference between the target intensity and the actual intensity may be based on a noise threshold that is determined based on a position of the display pixel within the reconstructed image relative to a determined position of a feature of the user's eye as discussed in further detail below.

As discussed above, the reconstructed image projected from the DDH 206 into the user's eye 208 may include noise that is non-uniformly distributed across the reconstructed image based on a position of a feature of the user's eye 208. In particular, the image noise may be positioned away from the position of the determined feature in order to obscure the noise such that it is less perceptible by the user's eye 208. To facilitate such functionality, the holographic display system 200 includes an eye tracker 218 configured to track a current position of a feature of the user's eye 208. In some examples, the eye tracker 218 may be configured to track the position of the pupil 212. For example, the eye tracker 218 may include a light source that projects light onto the use's eye 208, and the eye tracker 218 may include an image sensor that captures light reflected from a cornea of the user's eye with which glints and/or other features can be identified to determine the pupil position. In some examples, the eye tracker 218 may be configured to determine a diameter and/or perimeter of the pupil 212.

The eye tracker 218 may be configured to track the position of the fovea 216 in the retina 214 of the user's eye 208. In some examples, the eye tracker 218 may be configured to determine the position of the fovea 216 via direct measurement. In some examples, the eye tracker 218 may be configured to derive the position of the fovea 216 from the measured position of the pupil 212 or based on measuring another aspect of the user's eye 208.

It will be appreciated that the eye tracker 218 may be configured to determine the position of any suitable feature of the user's eye 208. Further, the eye tracker 218 may employ any suitable eye tracking technology to track the position of a feature of the user's eye.

The eye tracker 218 may be configured to provide the tracked position of the feature of the user's eye 208 to the controller 220, which may be configured to control the light source 202 and the DDH 206 in conjunction to form the reconstructed image in the user's eye 208.

The controller 220 may be implemented as any suitable processing componentry, including a logic subsystem and storage subsystem as described below with respect to FIG. 10. It will be understood that the components and arrangements shown in FIG. 2 are presented for the sake of example and are not limiting.

Figure 4:
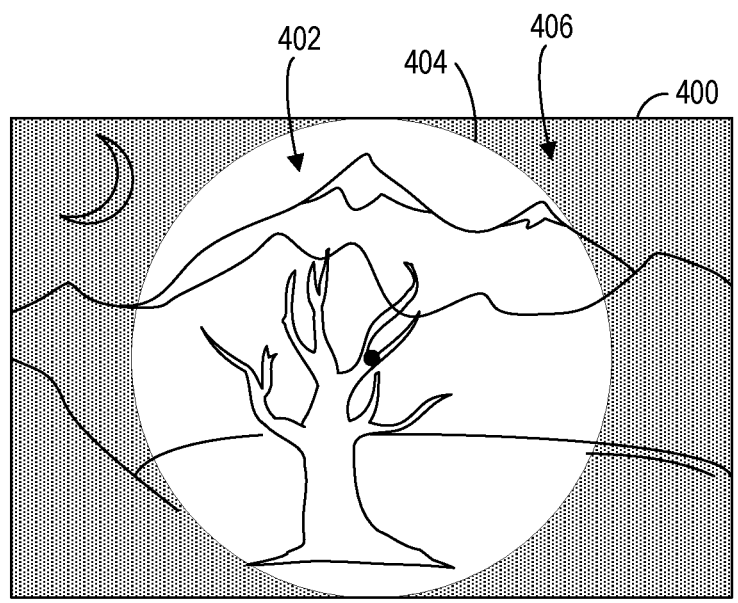
FIGS. 4-6 show example reconstructed images of the target image of FIG. 3 that are generated based on different positions of features of an eye.

The reconstructed image includes noise that is non-uniformly distributed across the reconstructed image based on the position of the tracked feature of the user's eye 208. In some implementations, the pupil 212 of the user's eye 208 may be used as a mask for the noise. In such implementations, the holographic display system 200 may be configured to form an eyebox that is larger than a maximum pupil diameter of the user's eye 208. FIG. 4 shows an example reconstructed image 400 generated based on the target image 300 shown in FIG. 3. The reconstructed image 400 includes a central region 402 that falls within a perimeter 404 of the pupil of the user's eye and a peripheral region 406 that falls outside of the perimeter 404 of the pupil of the user's eye. The peripheral region 406 can be treated as a "do not care area" when designing the hologram, as any light incident on this area will be blocked from being received by the retina, and thus not perceived by the user's eye. The holographic display system 200 may be configured to distribute more noise in the peripheral region 406 and less noise in the central region 402 of the reconstructed image 400. In some examples, the central region 402 of the reconstructed image 400 may include substantially little or no noise.

For this example, a circular binary mask may be is used within a hologram design algorithm (HDA) for generating the reconstructed image in order to mimic the physical shape of the eye pupil. In a practical application of this approach, the eye tracker 218 may accurately track the position of the pupil 212 of the user's eye 208 and the holographic display system 200 may dynamically adjust the size and/or position of the central region 402 and the peripheral region 406 of the reconstructed image 400 based on the determined position and size of the pupil 212 to allow the image to be formed in the correct location to obscure the undesired noise from being perceived by the user.

Figure 5:
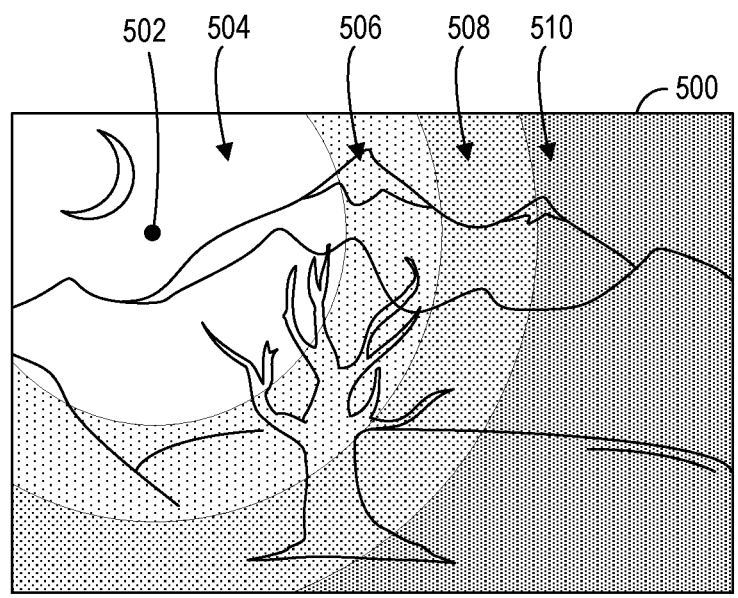
Figure 6:
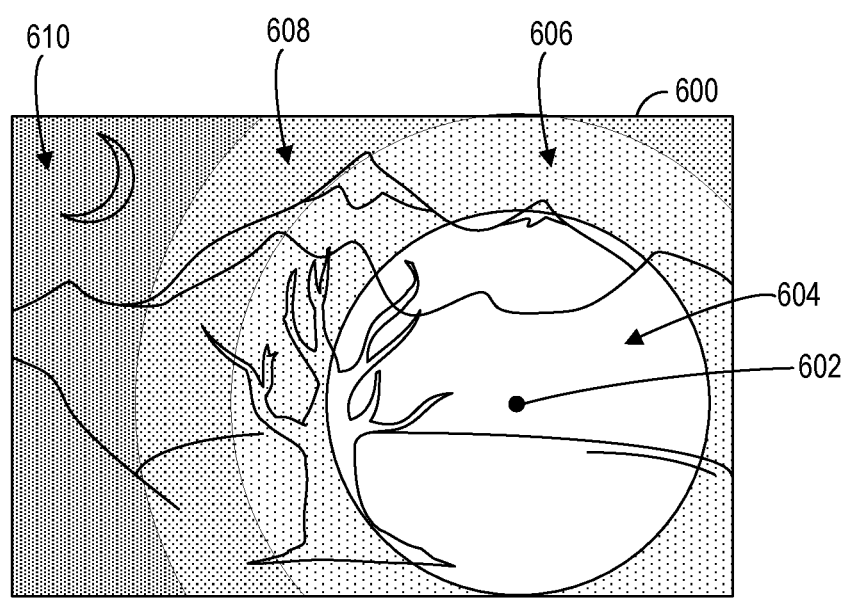

In some implementations, a reconstructed image may be generated based on a position of the fovea 216 in the retina 214 of the user's eye 208 as determined by the eye tracker 218. In such implementations, the holographic display system 200 may be configured to distribute noise within the reconstructed image in a manner that mimics the perceptive field of the human eye. In other words, the noise may be positioned in the peripheral region (outside the fovea) where the perceptive power of the eye is reduced. FIGS. 5 and 6 show example reconstructed images 500 and 600 generated based on the target image 300 shown in FIG. 3. In FIG. 5, a reconstructed image 500 includes a plurality of different regions (e.g., 504, 506, 508, 510) that are dynamically determined based on the position 502 of the fovea 216 of the user's eye 208. For example, the user may be looking at the moon in the upper left corner of the image. In the depicted example, the plurality of different regions of the reconstructed image 500 are concentric regions centered on the position 502 of the fovea 216 of the user's eye 208. For example, the concentric regions may be formed using a rotationally symmetric function. Each region may have a different noise threshold. The central foveal region 504 is given preference in terms of optimization for noise reduction, resulting in near-perfect image formation in this region. Outside of the foveal region, a graduated drop-off in quality is achieved using a graduated mask to maximize perceived visual quality. In other words, the regions that are closer to the position 502 of the fovea 216 of the user's eye 208 may include less noise and the regions further from the position of the fovea 216 of the user's eye 208 may include more noise. In this way, noise may be distributed around the edges of the reconstructed image 500, that is in the periphery of the user's vision.

The eye tracker 218 is used to determine at what location the user is currently looking (e.g., the position of the fovea), and the holographic display system 200 is configured to dynamically center the plurality of regions of the reconstructed image on this location. As the user's eye moves, the regions of the reconstructed image with the lowest noise (i.e., highest quality) tracks the position of the fovea 216 of the user's eye 208.

FIG. 6 shows a reconstructed image 600 generated based on an updated position of the fovea 216. For example, the user may be looking at the base of the mountains in the lower right corner of the image. The reconstructed image 600 includes a plurality of different regions (e.g., 604, 606, 608, 610) that are dynamically determined based on the position 602 of the fovea 216 of the user's eye 208. The central foveal region 604 is given preference in terms of optimization for noise reduction, resulting in near-perfect image formation in this region. Outside of the foveal region, a graduated drop-off in quality is achieved with regions that are closer to the position 502 of the fovea 216 having less noise and the regions further from the position of the fovea having more noise. This has the effect of providing near-perfect image quality across the whole field of view. Noise in the edges of the image is not perceived due to the lower resolution of the eye in the periphery.

The concentric regions of the reconstructed images are provided as an example and are meant to be non-limiting. It will be appreciated that the holographic display system 200 may divide a reconstructed image into any suitable number of different regions having different noise thresholds. In some examples, a region may be as small as a single pixel. In some implementations, a reconstructed image may be divided into a foveal region and a peripheral region. In some such implementations, the foveal region may have little or no noise, and noise outside of the foveal region may be smoothly graduated from the perimeter of the foveal region to the periphery of the reconstructed image. In some implementations, noise may be distributed in a reconstructed image as a function of a pixel's relative distance to a position of the fovea (or another feature of the user's eye). It will be appreciated that the holographic display system may non-uniformly distribute noise within a reconstructed image in any suitable manner.

Figure 7:
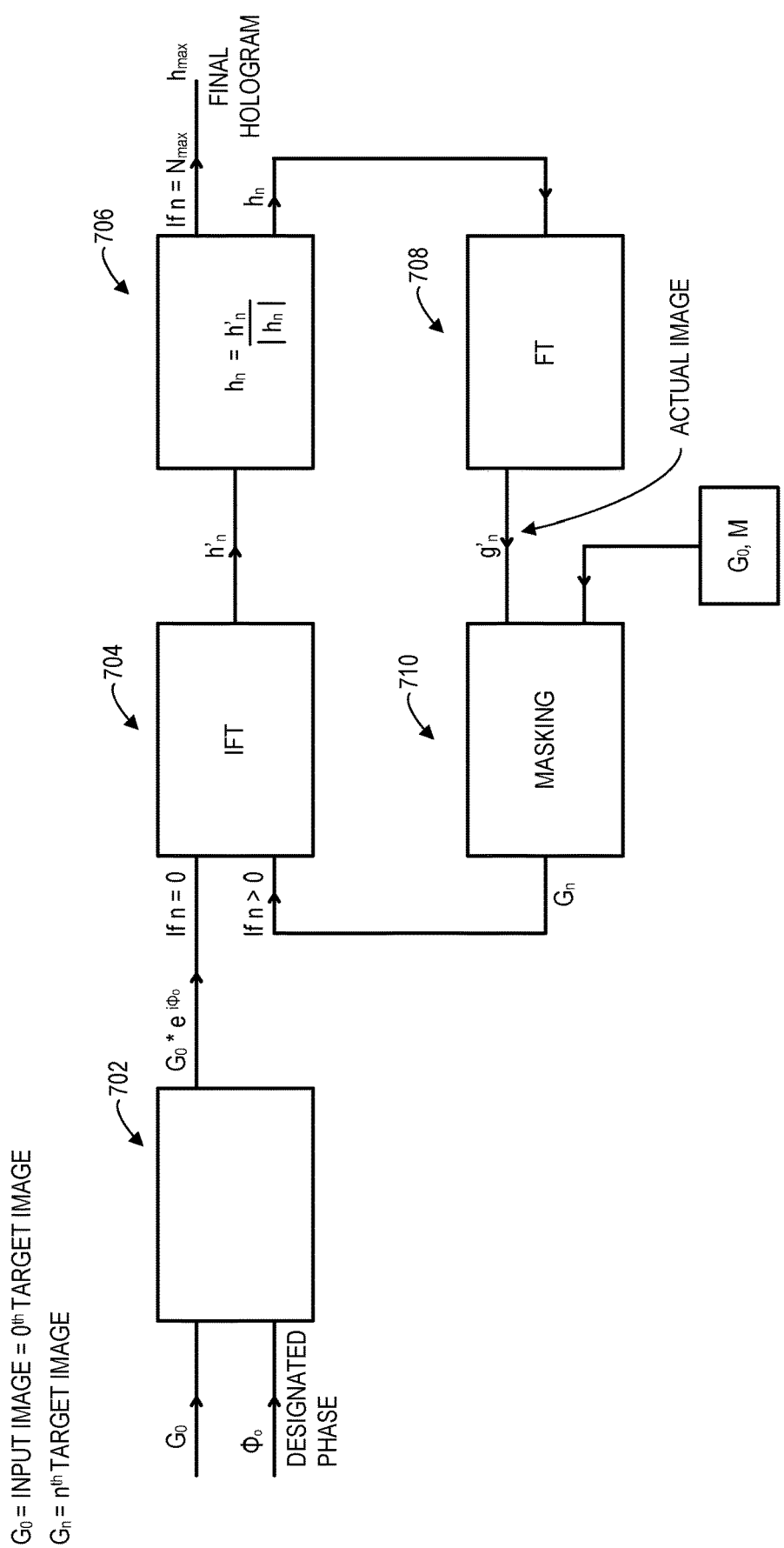
FIG. 7 schematically shows an example iterative hologram design algorithm.

The controller 220 of the holographic display system 200 may employ a holographic design algorithm (HDA) to generate a reconstructed image according to the approach described herein. FIG. 7 schematically shows an example HDA 700 that may be employed by the holographic display system 200. The HDA 700 involves an iterative cycle of forward and backward Fourier transforms with amplitude constraints imposed at each iteration. The HDA 700 imposes amplitude conditions on the hologram plane, h(x, y) and image plane g(u, v) while allowing their phases to drift into an optimum value. The coordinates of the hologram plane are x and y and of the image plane u and v. For simplicity x, y, u and v are omitted and the hologram plane is denoted as h and the image plane is denoted as g.

For iteration n of the HDA 700, at 702, the image plane $g_n$ is assigned the intensity of the target image $G_0$ and a designated phase (e.g., a random phase). At 704, the hologram plane, $h_n$ is computed using the inverse Fourier transform of the image plane. The hologram plane is now a complex function with variable amplitude. Since the phase-only hologram, $h_n$ is used, amplitude of unity is imposed on the hologram plane at 706. In the next step, at 708, the Fourier transform of the phase-only hologram is computed and the image plane $g'_n$ is found. The amplitude of the nth image plane $g_n$ is used to calculate the error between the actual reconstruction g' and the target image $G_0$. The error is used to change the amplitude of the target image plane into $G_n$, which is the next target image. In general, if a point on the image plane has value smaller that the target value, the value of $G_n$ will change such that it encourages an increase of its value. At 710, a feedback function is applied using a threshold M that may change based on a position of the pixel relative to the position of the fovea (or another feature of the eye). This is described mathematically as:

$G_n$=Mask(Target_Image−
　　Error*Feedback_Parameter)+(1−Mask)*Current_Image or $G_n = M[G_0 + (G_0 - |g'_n|)k] + (1-M)|g'_n|$ When Mask=0 the image pixels for the next iteration are left unchanged, i.e. to the same value in the next iteration as the current. This minimizes the constraints imposed on the hologram design for that region and leaves more freedom for the rest of the image (to reduce noise). When M=1, pixels are pushed to get their target value defined by the Target_Image combined with the error and the Feedback_Parameter. The value of M may change according to different regions that mimic the perceptive field of the eye. The value of M may be greater closer to the foveal region to allow for less (or no noise). Further, the threshold may drop outside this region with the remainder of the image having a lower threshold that allows for more noise.

Figure 8:
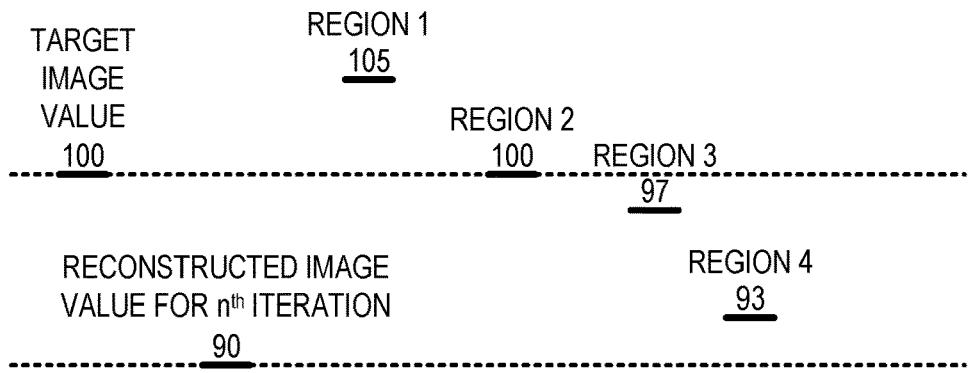
FIG. 8 shows a graph depicting aspects of the iterative hologram design algorithm of FIG. 7.

FIG. 8 shows an example of different regions of a reconstructed image having different threshold values for a $n^{th}$ iteration of the HDA 700. In this example, the target intensity of $G_0$=100. The reconstructed image intensity $g'_n$=90. If the pixel is placed in the foveal region (region 1), the threshold value for $G_n$ for that pixel is set to 105 in order to ensure that the reconstructed intensity is pushed up to the target intensity in the next iteration so that minimal noise is produced. If the pixel is placed in the adjacent region (region 2), the threshold value is set to 100 so that it is likely that the reconstructed intensity reaches the target intensity. The other peripheral regions (region 3 and region 4) have lower threshold values (97, 93) that create additional freedom, which is manifest as higher variance noise. The lower thresholds in the peripheral regions allow for greater optimization of the foveal region (region 1) and hence lower variance noise. As such, higher quality can be achieved in the foveal region than could be achieved relative to distributing noise uniformly across the image.

The HDA 700 may repeated the iterative process repeated until the phase-only hologram converges into a value that forms the target image with acceptable quality based on the particular noise threshold.

The HDA 700 is provided as an example and is meant to be non-limiting. Other HDAs may be contemplated. In some examples, a non-iterative HDA may be employed by the holographic display system 200.

Figure 9:
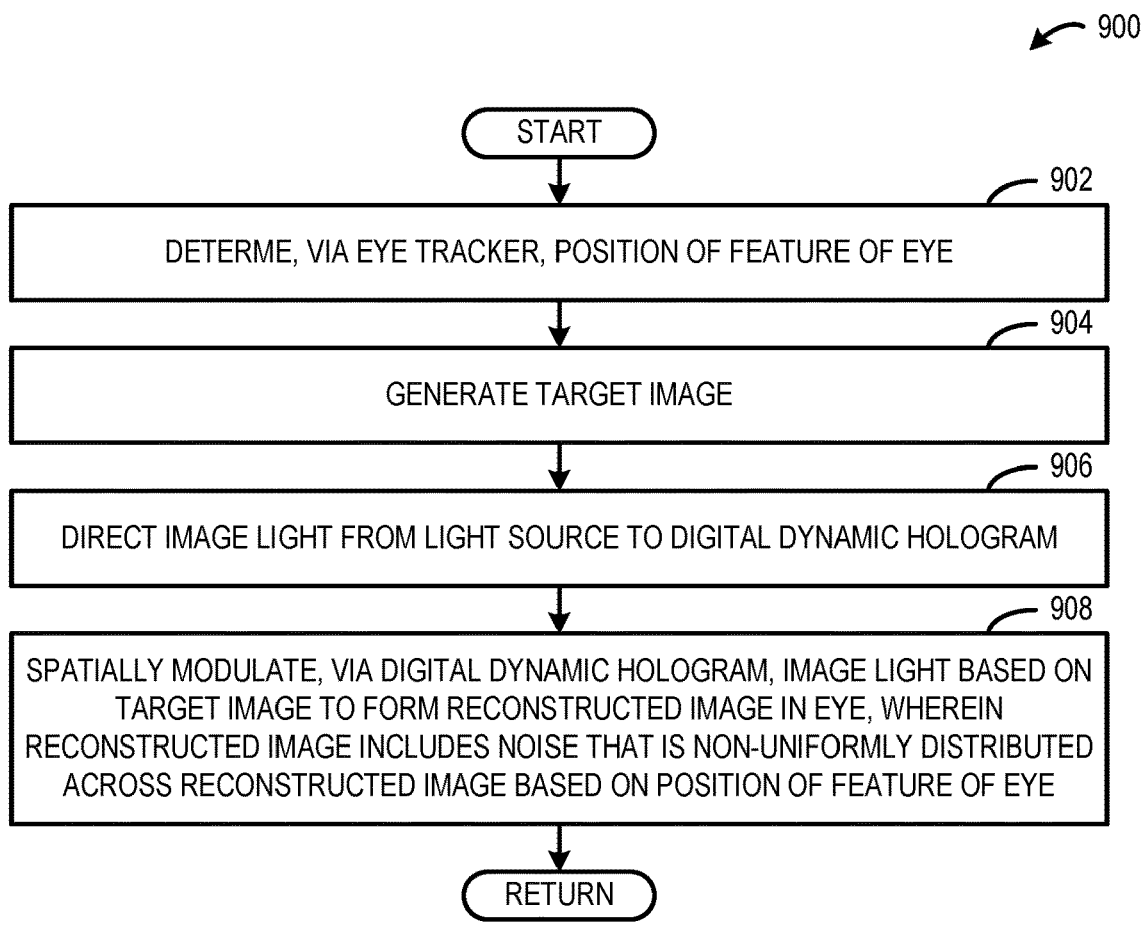
FIG. 9 is a flow chart depicting aspects of an example holographic display method.

FIG. 9 depicts aspects of an example holographic display method 900. For example, the method 900 may be performed by the holographic display system 200 shown in FIG. 2. Generally, the method 900 may be performed by any suitable holographic display device. At 902, the method 900 includes determining, via an eye tracker, a position of a feature of an eye. In some implementations, the feature may include an eye pupil. In some implementations, the feature may include a fovea in a retina of an eye. At 904, the method 900 includes generating a target image. At 906, the method 900 includes directing image light from a light source to a digital dynamic hologram. At 908, the method 900 includes spatially modulating, via the digital dynamic hologram, the image light based on the target image to form a reconstructed image in the eye. The reconstructed image includes noise that is non-uniformly distributed across the reconstructed image based on the position of the feature of the eye. The method of FIG. 9 may be implemented as applicable in conjunction with any of the hardware and systems described herein.

In some examples where the feature of the eye is the pupil, the noise may be placed in a region in the region that is outside a perimeter of the pupil such that the noise is blocked from being received at the retina of the eye. In some examples where the feature of the eye is the fovea, the noise may be distributed in the reconstructed image such that a central foveal region is given preference in terms of optimization for noise reduction, and outside of the foveal region noise is distributed in a graduated manner with more noise being distributed further away from the foveal region.

In both examples, noise may be positioned in regions of the image that are peripheral to tracked feature of the eye, where the perceptive power of the eye is weaker. In accordance with the holographic display method, the reconstructed image may be perceived by the user as being of higher quality, since the noise is less perceptible by the user.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
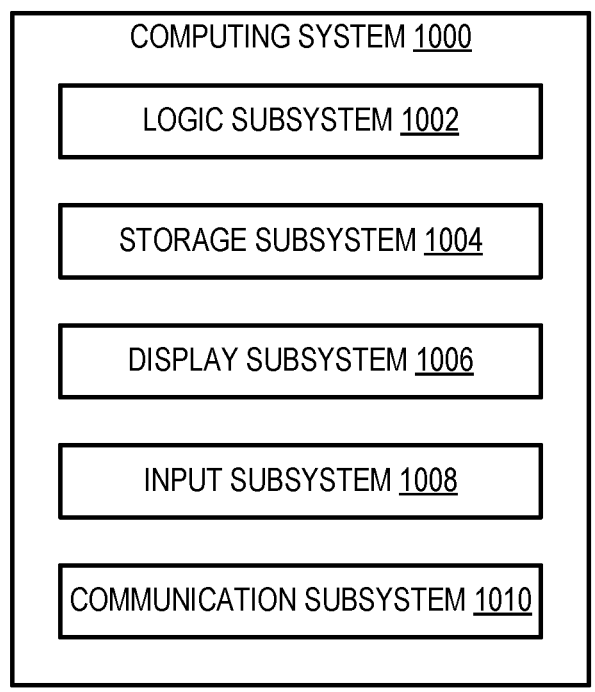
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 1000 may be representative of near-eye display device 100 in FIG. 1 and holographic display system 200 in FIG. 2.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem 1002 may be configured to execute instructions that are part of one or more applications, services, or other logical constructs. The logic subsystem 1002 may include one or more hardware processors configured to execute software instructions. Additionally or alternatively, the logic subsystem 1002 may include one or more hardware or firmware devices configured to execute hardware or firmware instructions. Processors of the logic subsystem 1002 may be single-core or multi-core, and the instructions executed thereon may be configured for sequential, parallel, and/or distributed processing. Individual components of the logic subsystem 1002 optionally may be distributed among two or more separate devices, which may be remotely located and/or configured for coordinated processing. Aspects of the logic subsystem 1002 may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem 1002. When the storage subsystem 1004 includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem 1002 executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 1002 and the storage subsystem 1004 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem 1010 may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

In an example, a holographic display system comprises an eye tracker configured to determine a position of a feature of an eye, a light source configured to output image light, and a digital dynamic hologram configured to receive the image light from the light source and spatially modulate the image light based on a target image to form a reconstructed image in the eye, wherein the reconstructed image includes noise that is non-uniformly distributed across the reconstructed image based on the position of the feature of the eye. In this example and/or other examples, the reconstructed image may include a plurality of regions dynamically determined based on the position of the feature of the eye, and different regions may have different noise thresholds such that regions closer to the position of the feature of the eye include less noise and regions further from the position of the feature of the eye include more noise. In this example and/or other examples, the plurality of regions may be concentric regions centered on the position of the feature of the eye. In this example and/or other examples, the feature of the eye may be a fovea in a retina of the eye. In this example and/or other examples, the feature of the eye may be a pupil of the eye. In this example and/or other examples, a size of the reconstructed image may be larger than a maximum pupil diameter of the eye, and the noise may be positioned in the reconstructed image outside of the pupil of the eye. In this example and/or other examples, the target image may include a plurality of image pixels, each image pixel may have a target intensity, and the digital dynamic hologram may be configured, for each of a plurality of display pixels corresponding to the plurality of image pixels, to modulate a phase of an incident wavefront of the image light based on the target intensity of the corresponding image pixel to output an actual intensity, wherein a difference between the target intensity and the actual intensity may be based on a noise threshold that is determined based on the position of the pixel within the reconstructed image relative to the position of the feature of the eye. In this example and/or other examples, the noise may be distributed as a function of a distance relative to the feature of the eye. In this example and/or other examples, the actual intensity of each display pixel of the reconstructed image may be determined using an iterative hologram design algorithm. In this example and/or other examples, the holographic display may be a near-eye display of a head mounted device.

In an example, a holographic display method comprises determining, via an eye tracker, a position of a feature of an eye, generating a target image, directing image light from a light source to a digital dynamic hologram, and spatially modulating, via the digital dynamic hologram, the image light based on the target image to form a reconstructed image in the eye, wherein the reconstructed image includes noise that is non-uniformly distributed across the reconstructed image based on the position of the feature of the eye. In this example and/or other examples, the reconstructed image may include a plurality of regions dynamically determined based on the position of the feature of the eye, and different regions may have different noise thresholds such that regions closer to the position of the feature of the eye include less noise and regions further from the position of the feature of the eye include more noise. In this example and/or other examples, the plurality of regions may be concentric regions centered on the position of the feature of the eye. In this example and/or other examples, the noise may be distributed as a function of a distance relative to the feature of the eye. In this example and/or other examples, the feature of the eye may be a fovea in a retina of the eye. In this example and/or other examples, the feature of the eye may be a pupil of the eye. In this example and/or other examples, a size of the reconstructed image may be larger than a maximum pupil diameter of the eye, and the noise may be positioned in the reconstructed image outside of the pupil of the eye.

In an example, a near-eye display device comprises a holographic display system, comprising an eye tracker configured to determine a position of a fovea in a retina of an eye of the wearer of the near-eye display device, a light source configured to output image light, and a digital dynamic hologram configured to receive the image light from the light source and spatially modulate the image light based on a target image to form a reconstructed image in the eye, wherein the reconstructed image includes noise that is non-uniformly distributed across the reconstructed image based on the position of the fovea. In this example and/or other examples, the reconstructed image may include a plurality of regions dynamically determined based on the position of fovea, and different regions may have different noise thresholds such that regions closer to the position of the fovea include less noise and regions further from the position of the fovea include more noise. In this example and/or other examples, the plurality of regions may be concentric regions centered on the position of the fovea.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A holographic display system, comprising:
an eye tracker configured to determine a position of a pupil of an eye;
a light source configured to output image light; and
a digital dynamic hologram configured to receive the image light from the light source and spatially modulate the image light based on a target image to form a reconstructed image in the eye, wherein a size of the reconstructed image is larger than a maximum pupil diameter of the eye wherein the reconstructed image includes noise that is non-uniformly distributed across the reconstructed image based on the position of the pupil of the eye such that the noise is positioned in the reconstructed image outside of the pupil of the eye.

2. The holographic display system of claim 1, wherein the reconstructed image includes a plurality of regions dynamically determined based on the position of the pupil of the eye, wherein the plurality of regions are concentric regions centered on the position of the pupil of the eye, and wherein regions closer to the position of the pupil include less noise and regions further from the position of the pupil include more noise.

3. The holographic display system of claim 1, wherein the target image includes a plurality of image pixels, each image pixel having a target intensity, and wherein the digital dynamic hologram is configured, for each of a plurality of display pixels corresponding to the plurality of image pixels, to modulate a phase of an incident wavefront of the image light based on the target intensity of the corresponding image pixel to output an actual intensity, wherein a difference between the target intensity and the actual intensity is based on a noise threshold that is determined based on the position of the pixel within the reconstructed image relative to the position of the pupil of the eye.

4. The holographic display system of claim 3, wherein the noise is distributed as a function of a distance relative to the pupil of the eye.

5. The holographic display system of claim 3, wherein the actual intensity of each display pixel of the reconstructed image is determined using an iterative hologram design algorithm.

6. The holographic display system of claim 1, wherein the holographic display is a near-eye display of a head mounted device.

7. A holographic display method, comprising:
determining, via an eye tracker, a position of a feature of an eye;
generating a target image;
directing image light from a light source to a digital dynamic hologram; and
spatially modulating, via the digital dynamic hologram, the image light based on the target image to form a reconstructed image in the eye, wherein the reconstructed image includes noise that is distributed across the reconstructed image as a function of a distance relative to the position of the feature of the eye.

8. The method of claim 7, wherein the feature of the eye is a fovea in a retina of the eye.

9. The method of claim 7, wherein the feature of the eye is a pupil of the eye.

10. The method of claim 9, wherein a size of the reconstructed image is larger than a maximum pupil diameter of the eye, and wherein the noise is positioned in the reconstructed image outside of the pupil of the eye.

11. A near-eye display device comprising:
a holographic di splay system, comprising:
an eye tracker configured to determine a position of a fovea in a retina of an eye of the wearer of the near-eye display device;
a light source configured to output image light; and
a digital dynamic hologram configured to receive the image light from the light source and spatially modulate the image light based on a target image to form a reconstructed image in the eye, wherein the reconstructed image includes more than two concentric regions dynamically determined based on the position of the fovea, wherein the reconstructed image includes noise that is non-uniformly distributed across the reconstructed image based on the position of the fovea such that concentric regions closer to the position of the fovea include less noise and concentric regions further from the position of the fovea include more noise.

* * * * *